Oct. 13, 1936.  F. GUNNISON  2,057,024
DEFECATOR WEIGHING DEVICE
Filed July 6, 1935  2 Sheets-Sheet 1
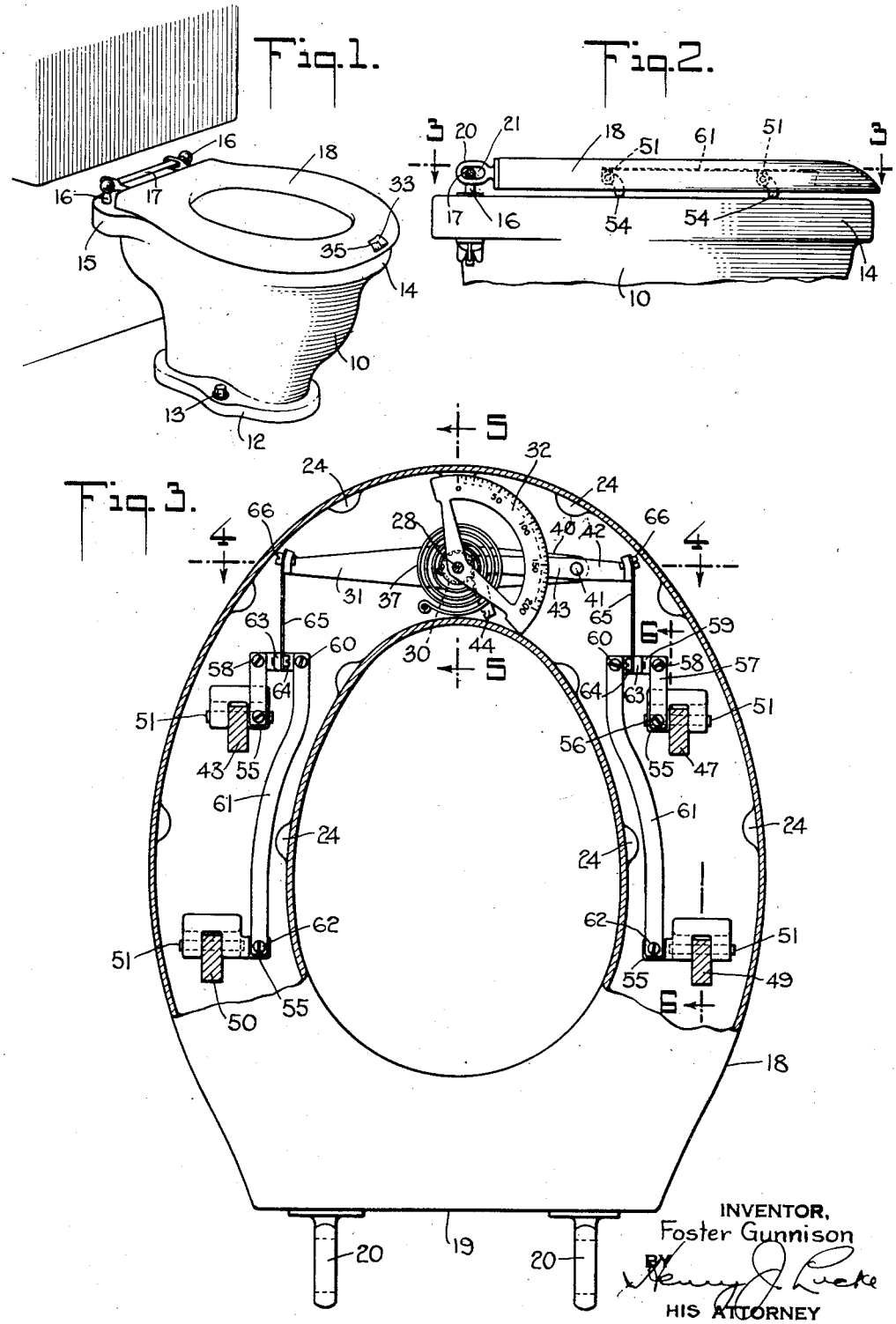
INVENTOR,
Foster Gunnison
BY
HIS ATTORNEY Oct. 13, 1936.  F. GUNNISON  2,057,024
DEFECATOR WEIGHING DEVICE
Filed July 6, 1935  2 Sheets-Sheet 2
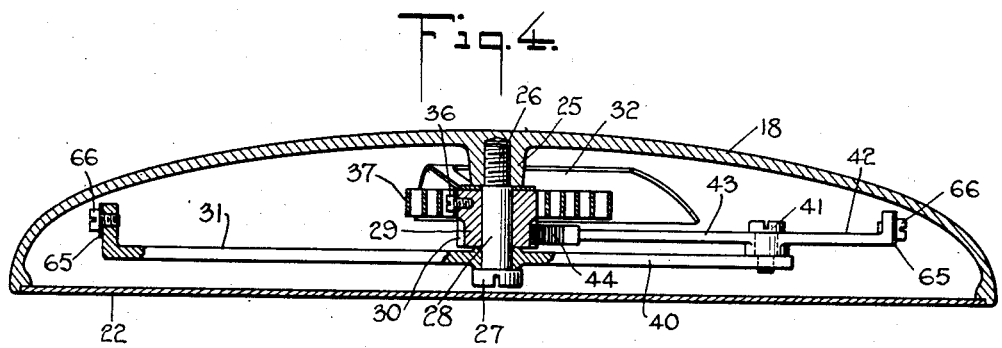
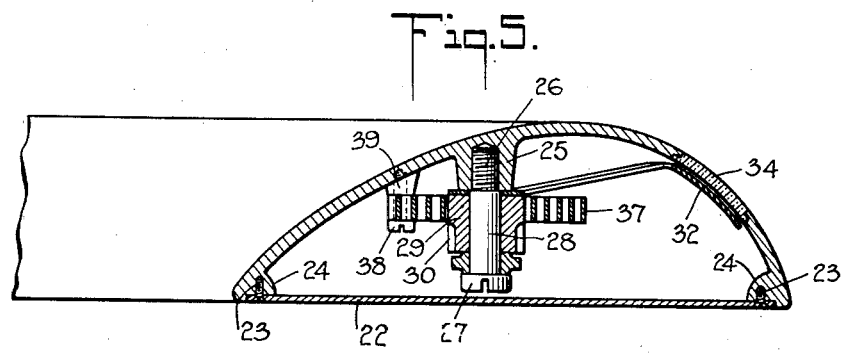
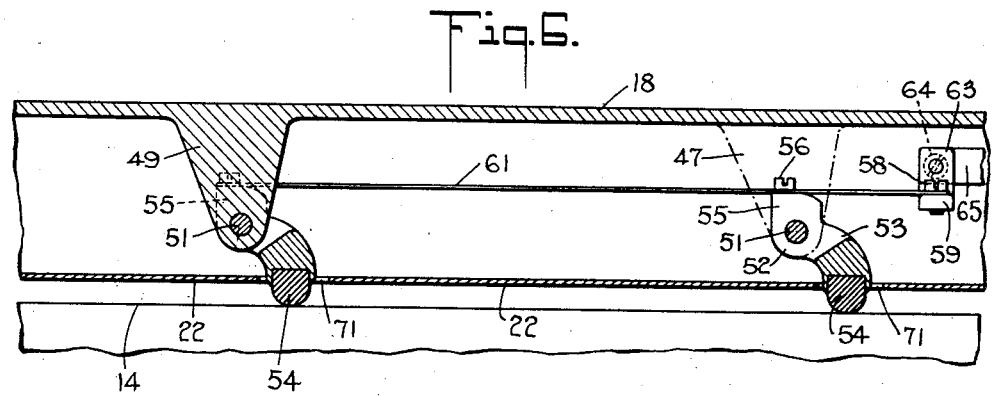
INVENTOR,
Foster Gunnison
BY
HIS ATTORNEY Patented Oct. 13, 1936

2,057,024

UNITED STATES PATENT OFFICE 2,057,024

DEFECATOR WEIGHING DEVICE

Foster Gunnison, New York, N. Y.

Application July 6, 1935, Serial No. 30,074

9 Claims. (Cl. 265—27)

My present invention relates to scales or weighing devices and more particularly to scales or weighing devices adapted to be utilized with toilets and preferably incorporated in the toilet seat.

Various types of scales or weighing devices are at present in use and are designed to be utilized in bathrooms and hospitals for the constant checking up of the weight of persons interested, with a view to noting variations in the weight of such persons from day to day. The use of such devices is especially valuable in the case of persons on a diet or convalescing from an illness. Where the ordinary scales and weighing devices, such as are at present in use, are available, it has been found that the same are not constantly and regularly used, as they are not constantly in view before the person who should use the same, and ordinarily are brought to such person's notice at an inopportune time, as for example, at the time when such person is practically on his or her way out of the bathroom.

My present device is designed to obviate the above noted objections, and is designed to be in such a position, as well as to be before the person using the bathroom or toilet, and where the desire—or temptation—to use the device is always present particularly during the time when such person is in a condition and/or position to use the device to the best advantage.

In carrying out my invention I preferably incorporate the same within the confines of the toilet seat, and with the registering or indicating dial in the front upper face of such seat, and therefore its presence is conspicuous and immediately attracts the attention of the user of the toilet.

An object of my invention therefore is an improved scale or weighing device for toilets and the like.

Another object of my invention is an improved scale incorporated in and forming part of the toilet seat.

A further object of my invention is an improved scale incorporated in a toilet seat and supporting the seat in position to operate the scale when the toilet seat is in position for use.

Other objects and novel features of the construction and arrangement of parts comprising my device will appear as the description of the invention progresses.

In the accompanying drawings illustrating one embodiment of my invention,

Fig. 1 is a perspective view of a toilet bowl having pivotally attached thereto, and on the top thereof, the usual toilet seat.

Fig. 2 is an enlarged side elevation of the upper portion of the toilet bowl shown in Fig. 1, and illustrating the pivotal and sliding connection of the toilet seat.

Fig. 3 is a sectional plan view, partly in elevation, on the line 3—3 of Fig. 2.

Fig. 4 is a sectional elevation on the line 4—4 of Fig. 3.

Fig. 5 is a sectional side elevation on the line 5—5 of Fig. 3, and

Fig. 6 is a sectional side elevation on the line 6—6 of Fig. 3.

Referring to the drawings, 10 designates the usual toilet bowl, provided at its lower end with a flange 12, through which may pass the fastening bolt 13 and by means of which the same is secured in position on the floor of a bathroom or other suitable place. Formed integral with the bowl and on the upper end thereof is the usual roll rim 14, the rear thereof having formed thereon lugs or ears 15 to which are secured the spaced standards 16 such standards supporting ordinarily a transverse rod or shaft 17 on which the toilet seat is ordinarily pivotally mounted.

The toilet seat in my present invention is preferably made hollow, and is indicated by the reference numeral 18. To the rear end 19 thereof are spaced members 20, each provided with an elongated slot 21, such slots being in alignment with each other and through which slot passes the rod or shaft 17. It will be obvious therefore that the toilet seat 18 is not only pivotally mounted on the rod or shaft 17, but is capable of sliding movement with respect thereto and therefore is capable of sliding movement in a plane parallel to the top of the roll edge 14 of the toilet bowl 10.

As above stated, the seat 18 is made hollow and for convenience in manufacturing and assembling the lower face of the toilet seat 18 is ordinarily open and is adapted to be closed by a plate 22 of any suitable material. Such plate 22 may be secured in closing position by means of screws 23 passing through the member 22, and screwing into threaded holes in lugs 24 formed integral with the seat 18 as clearly shown in Fig. 5.

To the front of the seat 18, and extending downwardly into the open space beneath its upper surface, is an integral boss 25, threaded as shown in Figs. 4 and 5, to receive the threaded end 26 of a screw shaft 27, the body portion 28 of such screw shaft acting as a shaft for a combined rotatable hub 29 and pinion 30, and also for an operating lever 31. The head of the screw shaft 27 is housed completely within the seat cover 18. Secured to the hub 29 in any suitable manner, and preferably adjustable thereon, is a dial plate 32, provided on its upper curved surface with graduations preferably indicating pounds and ounces, although any other system of nomenclature may be employed. The graduations above referred to lie beneath an observing window 33 in the upper front face of the seat 18, and such window 33 is preferably closed by a transparent pane 34 of glass, celluloid or any other suitable material, and on such window 34 is a zero line 35 with which the indicating zero on the scale above referred to is normally in registry when the device is not in use, and with which each of the graduations may be brought into registry as the hub 29 rotates on the shaft portion 28 of the screw shaft 27. Secured to the hub 29, by screw 36, is the inner end of an elliptical spring 37, the outer end of which is secured by a screw 38 to a boss 39 formed integral with the seat 18. The elliptical spring 37 when normally at rest, maintains the zero graduation 32 in registry with the zero line 35 on the window 34, and is so proportioned with respect to the operating linkage mechanism to be hereinafter described, as to accurately designate or indicate the weight of an object placed on the seat 18, by means of the scale 32 and zero line 35.

The lever 31 rotatably mounted on the shaft portion 28 of the screw shaft 27, is of any appropriate length and has formed integral therewith an extension 40 in alignment therewith and on the opposite side of the shaft member 28. Adjacent to the outer, or free end, of such extension 40 is a shaft member 41 on which is rotatably mounted a lever 42, and this lever has formed integral, and in alignment therewith, the arm 43, which carries a gear sector 44, which meshes with and rotates the pinion 29. The distance of the free end of the lever 31 from the center of the shaft 28 is substantially equal to the distance from the center of such shaft 28 to the free end of the lever 42.

Formed integral with the seat 18, on the under face thereof, and extending into the hollow space formed by the seat are downwardly depending bearing members 47, 48, 49 and 50 respectively. These bearing members are arranged in pairs transversely of the length of the seat 18, the bearing members 47 and 48 constituting the front pair, and the bearing members 49 and 50 constituting the rear pair. Also such bearing members are further arranged in pairs, the bearing members 47 and 49 constituting the right hand pair, and the bearing members 48 and 50 constituting the lefthand pair, as viewed in Fig. 3. In each of the bearing members 47 to 50 inclusive, is secured a shaft 51, which shaft extends outward from either side of the respective bearing members 47 and 50. On each said shaft 51 is rotatably mounted a member 52, and formed integral with each said member 52 is a forwardly and downwardly extending lever arm 53. Said lever arm at its lower end extends through an opening 54 in the bottom plate 22, and is provided with a member 54 preferably formed of resilient material, such as rubber.

The construction of the lower end of the lever arms 53 is such that the member 54 may be readily inserted therein or removed therefrom for repair or replacement. Also formed integral with the member 52 and on the upper end thereof, remote from the lever 53 is a second lever arm 55, Secured to the lever arms 55, attached to the forward pair of bearing members 47 and 48, by screws 56, and extending forwardly therefrom, are resilient and flexible but relatively inextensible members 57, such members 57 being attached at their forward ends, by screws 58, to the outer ends of a connecting plate 59, such plates 59 extending inward toward each other as viewed in Fig. 3.

To the inner ends of the connecting plates 59 are secured, by the screws 60, the forward ends of rearwardly extending members 61 of flexible, resilient but practically inextensible material, such members 61 being attached at their rear ends, by screws 62, to the rear pair of lever arms 55. On each of the connecting members 59, centrally located with respect thereto, and extending upwardly therefrom, are members 63, to which are attached, by screws 64, the rear ends of members 65 of resilient, flexible and practically inextensible material, such members 65 at their forward ends being secured to the ends of the operating levers 31 and 42 respectively by screws 66.

When the device is constructed and assembled in the manner above described, and with resilient members 54 at the lowered ends of the lever arms 53 in engagement with the top face of the roll edge 14 of the bowl 10, the dial plate 32 is adjusted to bring the zero indication thereon in registry with the zero line 35 on the window 34, and the device is ready for use. It will be obvious that if a weight is placed on the toilet seat 18 as by a person sitting thereon that not only will there be a downward movement of the toilet seat 18, but also, because of the connecting lever arms 53, there will also be imparted to such toilet seat 18 a movement parallel to the upper face of the roll rim 14. This will cause a rotation of the members 52 on the shafts 51 and consequent movement to the rear of the upper ends of the lever arms 55. There will result therefore a movement to the rear of the free ends of the lever arms 31 and 42, the movement of the lever arm 31 being about the shaft 28 as a centre and the rearward movement of the lever arm 42 about the shaft 41 as a centre. The amount of movement will be proportional to the weight placed on the toilet seat 18, and such movement will be transmitted to the dial 32 by the gear sector 44 and pinion 30.

The above is assuming that the weight placed on the seat 18 is evenly distributed over the entire area of such seat. If however, the weight on the seat 18 is not evenly distributed, as for example, if the weight is on that side of the seat as viewed in Fig. 3 more nearly over a pair of bearings 48 and 50, than over the bearings 47 and 49, it is obvious that there is a greater rearward movement of the free end of the lever 42. The weight indicated on the scale 32 however will correspond to the total weight on the seat 18 because of the differential action between the levers 31 and 42 permitted by the shaft 41 on which the lever 42 is rotatably mounted. The converse of the above is also true, that is, the total weight will be accurately indicated on the scale 32 should the larger portion of such weight be on the right hand side of the seat 18 as viewed in Fig. 3.

It will be obvious from the above that with my present weighing device or scale, positioned as it is, the toilet seat is constantly in view of a person entering a bathroom and will be more apt to be observed and to be used than if the device were a separate one and lodged, as is ordinarily the case, in a corner of the bathroom and usually behind a towel or other rack.

Various modifications of my invention will readily suggest themselves to those skilled in the art, and therefore I am not to be limited to the exact details of the construction as shown or described.

I claim:

1. In a weighing device for toilets and the like, the combination of a toilet bowl, a toilet seat pivotally mounted at one end on the top thereof, a weighing scale mechanism enclosed within the body of the toilet seat, and operating levers for said weighing scale mechanism extending through the bottom face of the toilet seat.

2. In a weighing device for toilets and the like, the combination of a toilet bowl, a toilet seat pivotally and slidably mounted at one end on the top thereof, a weighing scale mechanism enclosed within the body of the toilet seat, and operating levers for said weighing scale mechanism, extending through the bottom face of the toilet seat, and engaging the top of the toilet bowl, to support the toilet seat to permit longitudinal movement of the toilet seat on its support.

3. In a weighing device for toilets and the like, the combination of a toilet bowl, a toilet seat pivotally and slidably mounted at one end on the top thereof, a weighing mechanism enclosed within the body of the toilet seat, a sight window in the toilet seat, a movable scale, constituting part of the weighing mechanism, visible through the window, and operating levers for said weighing mechanism, extending through the bottom face of the toilet seat, and engaging with the top of the toilet bowl.

4. In a weighing device for toilets and the like, the combination of a toilet bowl, a toilet seat pivotally and slidably mounted at one end on the top thereof, a weighing mechanism enclosed within the body of the toilet seat, a sight window in the upper face of the toilet seat, a movable scale, constituting part of the weighing mechanism, visible through the window, and operating levers for said weighing mechanism, extending through the bottom face of the toilet seat, and engaging with the top of the toilet bowl.

5. In a weighing device for toilets and the like, the combination of a toilet bowl, a toilet seat pivotally and slidably mounted at one end on the top thereof, a weighing mechanism enclosed within the body of the toilet seat, a sight window in the upper front end of the toilet seat, a movable scale constituting part of the weighing mechanism visible through the window, and operating levers for said weighing mechanism, extending through the bottom face of the toilet seat, and engaging with the top of the toilet bowl.

6. In a weighing device for toilets and the like, the combination of a toilet bowl, a toilet seat, a weighing mechanism enclosed within the body of the toilet seat, a sight window in the toilet seat, a movable scale, constituting part of the weighing mechanism, visible through the window, and operating levers for said weighing mechanism, extending through the bottom face of the toilet seat, and engaging with the top of the toilet bowl.

7. In a weighing device for toilets and the like, the combination of a toilet bowl, a toilet seat, a weighing mechanism enclosed within the body of the toilet seat, and operating levers for said weighing mechanism, supporting the toilet seat on the top of the toilet bowl.

8. In a weighing device for toilets and the like, the combination of a toilet bowl, a toilet seat, a weighing mechanism, enclosed within the body of the toilet seat, and operating levers for said weighing mechanism, extending through the bottom face of the toilet seat, and permitting movement of the toilet seat toward and from the toilet bowl.

9. In a weighing device for toilets and the like, the combination of a toilet bowl, a toilet seat, a weighing mechanism, enclosed within the body of the toilet seat, and operating levers for said weighing mechanism, extending through the bottom face of the toilet seat, and permitting movement of the toilet seat parallel to the top of the toilet bowl.

FOSTER GUNNISON.